(12) United States Patent
Tooyama et al.

(10) Patent No.: US 8,977,272 B2
(45) Date of Patent: Mar. 10, 2015

(54) MOBILE COMMUNICATION SYSTEM, AND MOBILE COMMUNICATION METHOD AND RADIO CONTROL DEVICE USED IN MOBILE COMMUNICATION SYSTEM

(75) Inventors: Hiroto Tooyama, Chiyoda-ku (JP); Kouji Makino, Chiyoda-ku (JP); Yoshifumi Morihiro, Chiyoda-ku (JP); Narumi Umeda, Chiyoda-ku (JP); Masato Hiraki, Chiyoda-ku (JP); Shinsuke Sawamukai, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 24 days.

(21) Appl. No.: 14/001,993

(22) PCT Filed: Feb. 21, 2012

(86) PCT No.: PCT/JP2012/054062
§ 371 (c)(1),
(2), (4) Date: Aug. 28, 2013

(87) PCT Pub. No.: WO2012/117885
PCT Pub. Date: Sep. 7, 2012

(65) Prior Publication Data
US 2013/0337816 A1 Dec. 19, 2013

(30) Foreign Application Priority Data
Feb. 28, 2011 (JP) ................................. 2011-042676

(51) Int. Cl.
*H04W 36/00* (2009.01)
*H04W 24/06* (2009.01)
*H04W 24/04* (2009.01)
*H04W 24/08* (2009.01)

(52) U.S. Cl.
CPC ...... *H04W 36/0055* (2013.01); *H04W 36/0061* (2013.01); *H04W 24/08* (2013.01); *H04W 24/06* (2013.01); *H04W 24/04* (2013.01)
USPC ........... 455/439; 455/444; 455/443; 455/438; 455/450

(58) Field of Classification Search
CPC ..... H04W 24/02; H04W 24/04; H04W 24/06; H04W 24/08; H04W 36/0055; H04W 36/0061; H04W 36/0066; H04W 36/0072; H04W 36/0077

USPC ................................. 455/439, 444, 443, 438
See application file for complete search history.

(56) References Cited

U.S. PATENT DOCUMENTS

| 2001/0053695 | A1* | 12/2001 | Wallentin ....................... 455/436 |
| 2008/0108364 | A1* | 5/2008 | Nishimura et al. ........... 455/450 |
| 2009/0042578 | A1* | 2/2009 | Rinne et al. .................... 455/442 |

FOREIGN PATENT DOCUMENTS

| JP | 10-336721 A | 12/1998 |
| JP | 11-27725 A | 1/1999 |
| JP | 2002-94418 A | 3/2002 |
| JP | 2010-515383 A | 5/2010 |
| WO | WO 2008/083374 A2 | 7/2008 |

OTHER PUBLICATIONS

International Search Report issued Mar. 19, 2013 in Patent Application No. PCT/JP2012/054062 with English Translation.

* cited by examiner

*Primary Examiner* — Khai M Nguyen
(74) *Attorney, Agent, or Firm* — Oblon, McClelland, Maier & Neustadt, L.L.P.

(57) ABSTRACT

A mobile communication system includes a first radio control device that manages a first cell, a second radio control device that manages a second cell, and a third radio control device. The second cell is set as a handover destination cell of the first cell. The third radio control device manages the second cell as a redundant configuration of the second radio control device. The third radio control device notifies the first radio control device of the third radio control device managing the second cell as the redundant configuration of the second radio control device. The first radio control device sets so that the third radio control device manages the second cell as the redundant configuration of the second radio control device.

7 Claims, 6 Drawing Sheets

FIG. 3

| No. | HO source | | | | | HO destination | | | | | STATUS |
|---|---|---|---|---|---|---|---|---|---|---|---|
| | HO source cell | HO source NB | HO source RNC | Real address | Virtual address | HO destination cell | HO destination NB | HO destination RNC | Real address | Virtual address | |
| 1 | #1C | 20C | 30C | ccccc | - | #2B | 20B | 30B | bbbbbb | - | "ACT" |
| 2 | #2B | 20B | 30B | bbbbbb | - | #1C | 20C | 30C | cccccc | - | "ACT" |
| 3 | #2C | 20C | 30C | cccccc | - | ... | ... | ... | ... | - | "ACT" |
| 4 | ... | ... | ... | | - | #2C | 20C | 30C | cccccc | - | "ACT" |
| 5 | #2A | 20A | 30A | aaaaaa | - | #1B | 20B | 30C | - | xxxccc | "ACT" |
| 6 | #1B | 20B | 30C | - | xxxccc | #2A | 20A | 30A | aaaaaa | - | "ACT" |
| ... | ... | ... | ... | ... | ... | ... | ... | ... | ... | ... | ... |

FIG. 4

| No. | HO source | | | | | HO destination | | | | | STATUS |
|---|---|---|---|---|---|---|---|---|---|---|---|
| | HO source cell | HO source NB | HO source RNC | Real address | Virtual address | HO destination cell | HO destination NB | HO destination RNC | Real address | Virtual address | |
| 1 | #1A | 20A | 30C | aaaaaa | - | ... | ... | ... | ... | - | "ACT" |
| 1 | ... | ... | ... | ... | - | #1A | 20A | 30C | aaaaaa | - | "ACT" |
| 3 | #1B | 20B | 30B | bbbbbb | - | #2A | 20A | 30C | aaaaaa | - | "ACT" |
| 3 | #2A | 20A | 30C | aaaaaa | - | #1B | 20B | 30B | bbbbbb | - | "SBY" |
| 4 | #1B | 20B | 30B | bbbbbb | - | #2A | 20A | 30C | aaaaaa | - | "SBY" |
| 5 | #2A | 20A | 30A | aaaaaa | - | #1B | 20B | 30C | - | xxxccc | "ACT" |
| 6 | #1B | 20B | 30C | - | xxxccc | #2A | 20A | 30A | aaaaaa | - | "ACT" |
| ... | ... | ... | ... | ... | ... | ... | ... | ... | ... | ... | ... |

MOBILE COMMUNICATION SYSTEM, AND MOBILE COMMUNICATION METHOD AND RADIO CONTROL DEVICE USED IN MOBILE COMMUNICATION SYSTEM

TECHNICAL FIELD

The present invention relates to a mobile communication system including a first radio control device that manages a first cell and a second radio control device that manages a second cell, and a mobile communication method and a radio control device used in the mobile communication system.

BACKGROUND ART

In the conventional art, there has been known a mobile communication system including a network device such as a radio base station (NB: NodeB) or a radio control device (RNC: Radio Network Controller).

A radio base station manages a cell on which a mobile station (UE: User Equipment) is to camp, and performs radio communication with the mobile station camping on the cell managed by the radio base station. In addition, the cell may be understood as a function of performing radio communication with the mobile station. Alternatively, the cell may be understood as a term indicating an arrival area (a geographical area) of an electric wave radiated from the radio base station. In addition, the cell is identified by a frequency, a spreading code, a time slot and the like used in the cell.

The radio control device manages a radio base station and a cell, and performs communication with a mobile station camping on the cell managed by the radio control device.

In the mobile communication system, a plurality of radio control devices are configured to be connected to one radio base station, and among the plurality of radio control devices, even when a failure occurs in one radio control device, another radio control device is configured to take over the function of the one radio control device.

There has been known a mobile communication system having a redundant configuration with respect to a network device such as the radio control device as described above (for example, Patent Literature 1).

However, there exists a case (hereinafter, referred to as Inter-RNC handover) in which a mobile station moves from a first cell managed by a first radio control device to a second cell managed by a second radio control device.

In the Inter-RNC handover, when a failure occurs in the second radio control device and a third radio control device takes over the function of the second radio control device, it is necessary for the first radio control device to understand information (hereinafter, referred to as redundant configuration information) indicating that the second cell is managed by the third radio control device.

However, since the amount of work for manually setting the redundant configuration information in the radio control device is enormous, manually setting the redundant configuration information is difficult.

CITATION LIST

Patent Literature

[PTL 1] Japanese Unexamined Patent Application Publication (Translation of PCT Application) No. 2010-515383

SUMMARY OF INVENTION

A mobile communication system according to a first characteristic includes a first radio control device that manages a first cell, a second radio control device that manages a second cell, and a third radio control device. The second cell is set as a handover destination cell of the first cell. The third radio control device manages the second cell as a redundant configuration of the second radio control device. The third radio control device notifies the first radio control device of the third radio control device managing the second cell as the redundant configuration of the second radio control device. The first radio control device sets so that the third radio control device manages the second cell as the redundant configuration of the second radio control device.

In the first characteristic, the third radio control device manages the second cell as the redundant configuration of the second radio control device upon request of the second radio control device.

In the first characteristic, the third radio control device manages in advance the second cell as the redundant configuration of the second radio control device without a request of the second radio control device.

In the first characteristic, the third radio control device notifies the first radio control device of the third radio control device managing the second cell as the redundant configuration of the second radio control device, in response to an inquiry from the first radio control device.

In the first characteristic, the first radio control device periodically inquires whether the second cell is managed as the redundant configuration.

A mobile communication method according to a second characteristic is used in a mobile communication system including a first radio control device that manages a first cell, a second radio control device that manages a second cell, and a third radio control device. The second cell is set as a handover destination cell of the first cell. The mobile communication method includes: a step of managing, by the third radio control device, the second cell as a redundant configuration of the second radio control device; a step of notifying, by the third radio control device, the first radio control device of the third radio control device managing the second cell as the redundant configuration of the second radio control device; and a step of setting, by the first radio control device, so that the third radio control device manages the second cell as the redundant configuration of the second radio control device.

A radio control device according to a third characteristic is used in a mobile communication system including a first radio control device that manages a first cell and a second radio control device that manages a second cell. The second cell is set as a handover destination cell of the first cell. The radio control device includes: a management unit that manages the second cell as a redundant configuration of the second radio control device; and a notification unit that notifies the first radio control device of the management unit managing the second cell as the redundant configuration of the second radio control device.

BRIEF DESCRIPTION OF DRAWINGS

FIG. 3 is a diagram illustrating information managed in RNC 30C according to the first embodiment.

FIG. 4 is a diagram illustrating information managed in RNC 30A according to the first embodiment.

DESCRIPTION OF EMBODIMENTS

Figure 1:
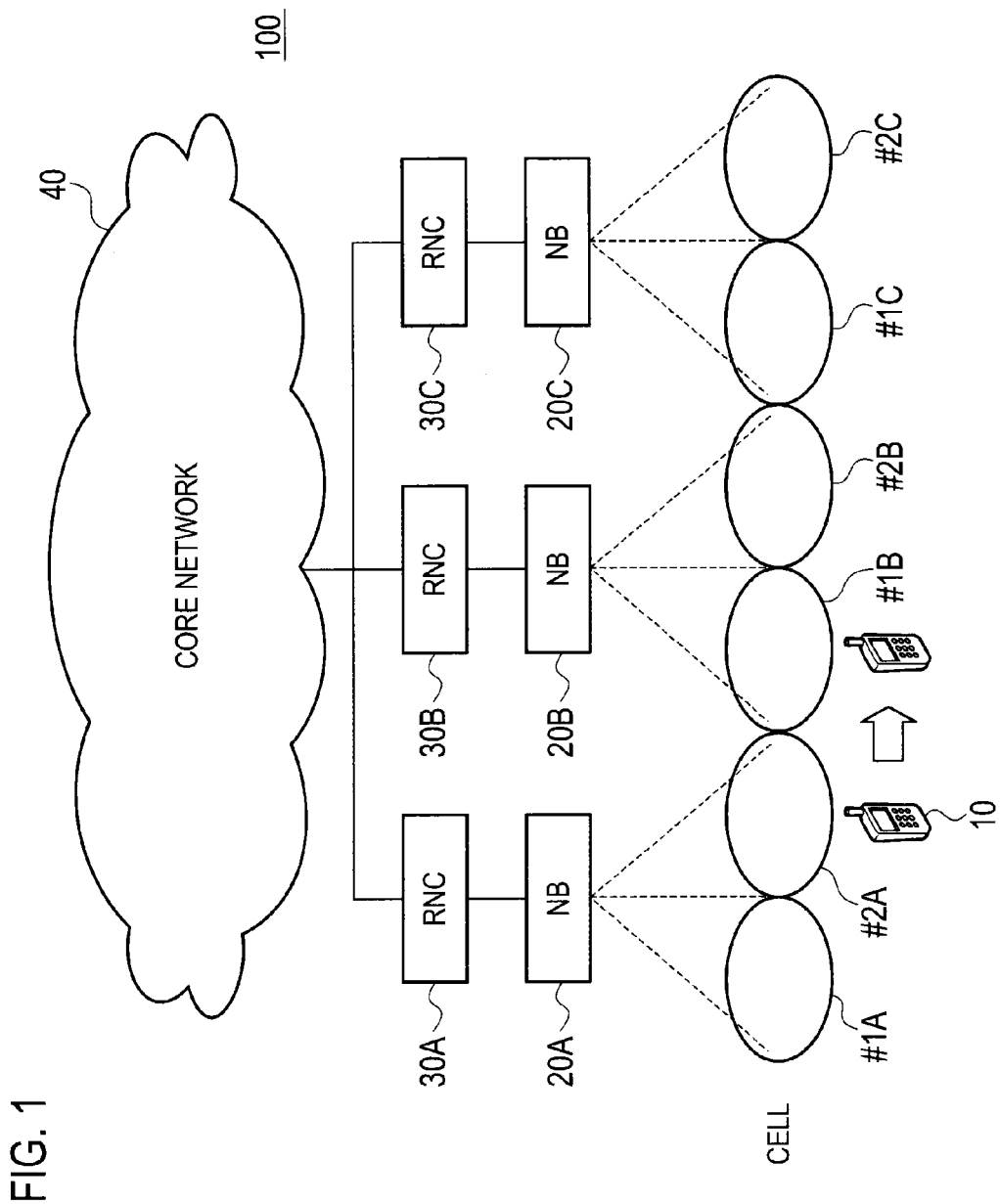
FIG. 1 is a diagram illustrating a mobile communication system 100 according to a first embodiment.

Hereinafter, a mobile communication system according to an embodiment of the present invention will be described with reference to the accompanying drawings. Note that in the descriptions of the drawing below, identical or similar symbols are assigned to identical or similar portions.

It will be appreciated that the drawings are schematically shown and the ratio and the like of each dimension are different from the real ones. Accordingly, specific dimensions should be determined in consideration of the explanation below. Of course, among the drawings, the dimensional relationship and the ratio may be different.

[Overview of Embodiment]

A mobile communication system according to an embodiment includes a first radio control device configured to manage a first cell, a second radio control device configured to manage a second cell, and a third radio control device. The second cell is set as a handover destination cell of the first cell. The third radio control device manages the second cell as a redundant configuration of the second radio control device. The third radio control device notifies the first radio control device of the third radio control device managing the second cell as the redundant configuration of the second radio control device. The first radio control device sets so that the third radio control device manages the second cell as the redundant configuration of the second radio control device.

In the embodiment, the third radio control device notifies the first radio control device of the third radio control device managing the second cell as the redundant configuration of the second radio control device. Consequently, in Inter-RNC handover, even when a failure occurs in a radio control device (here, the second radio control device), it is possible to set a detour path without requiring an enormous work amount.

[First Embodiment]

(Configuration of Mobile Communication System)

Hereinafter, the configuration of a mobile communication system according to a first embodiment will be described with reference to the accompanying drawings. FIG. 1 is a diagram illustrating a mobile communication system 100 according to the first embodiment.

As illustrated in FIG. 1, the mobile communication system 100 includes a mobile station 10 (hereinafter, referred to as UE 10), a plurality of radio base stations 20 (hereinafter, referred to as NBs 20), a plurality of radio control devices 30 (hereinafter, referred to as RNCs 30), and a core network 50.

The UE 10 is a device (User Equipment) having a function of performing radio communication. Specifically, the UE 10 camps on one of a plurality of cells, and performs radio communication with the NB 20 that manages a serving cell.

The NB 20 manages a cell, and is a device (NodeB) having a function of performing radio communication with the UE 10 camping on the cell.

In the first embodiment, NB 20A, NB 20B, and NB 20C are provided as the NBs 20. Furthermore, the NB 20A manages a cell #1A and a cell #2A, the NB 20B manages a cell #1B and a cell #2B, and the NB 20C manages a cell #1C and a cell #2C.

In addition, the cell #1A and the cell #2A are geographically adjacent to each other, the cell #1B and the cell #2B are geographically adjacent to each other, and the cell #1C and the cell #2C are geographically adjacent to each other. Furthermore, the cell #2A and the cell #1B are geographically adjacent to each other, and the cell #2B and the cell #1C are geographically adjacent to each other.

In the first embodiment, movement of the UE 10 between cells geographically adjacent to each other is called handover. Furthermore, movement of the UE 10 between cells managed by RNCs 30 different from each other is called Inter-RNC handover.

The RNC 30 manages a cell and the NB 20, and is a device (Radio Network Controller) having a function of performing communication with the UE 10 camping on the cell.

In the first embodiment, RNC 30A, RNC 30B, and RNC 30C are provided as the RNCs 30. Furthermore, the RNC 30A manages the NB 20A, the cell #1A, and the cell #2A, the RNC 30B manages the NB 20B, the cell #1B, and the cell #2B, and the RNC 30C manages the NB 20C, the cell #1C, and the cell #2C.

In addition, FIG. 1 illustrates the case in which one RNC 30 manages one NB 20. However, the embodiment is not limited thereto. That is, one RNC 30C may also manage two or more NBs 20.

For the Inter-RNC handover, the RNC 30 associates a handover source cell (hereinafter, referred to as a HO source cell) with a handover destination cell (hereinafter, referred to as a HO destination cell) to manage them. Similarly, the RNC 30 associates NB 20 (hereinafter, referred to as a HO source NB) that manages the HO source cell with NB 20 (hereinafter, referred to as a HO destination NB) that manages the HO destination cell to manage them. Moreover, the RNC 30 associates RNC 30 (hereinafter, referred to as a HO source RNC) that manages the HO source cell with RNC 30 (hereinafter, referred to as a HO destination RNC) that manages the HO destination cell to manage them. Furthermore, the RNC 30 associates a real address of the HO source RNC and a real address of the HO destination RNC to manage them.

In this way, the real address of the HO source RNC and the real address of the HO destination RNC are associated with each other, so that it is possible to perform the Inter-RNC handover.

In the first embodiment, a description will be mainly provided for Inter-RNC handover between the cell #2A (the first cell) managed by the RNC 30A (the first radio control device) and the cell #1B (the second cell) managed by the RNC 30B (the second radio control device). Furthermore, a description will be provided for the case in which the RNC 30C (the third radio control device) serves as a redundant configuration of the RNC 30B (the second radio control device).

In the first embodiment, the RNC 30C manages a virtual address required when the RNC 30C operates as a substitute of the RNC 30B, in preparation for a failure of the RNC 30B. Specifically, the RNC 30C associates a virtual address of the RNC 30C with the NB 20B and the cell #1B managed by the RNC 30B to manage them.

(Configuration of Radio Control Device)

Figure 2:
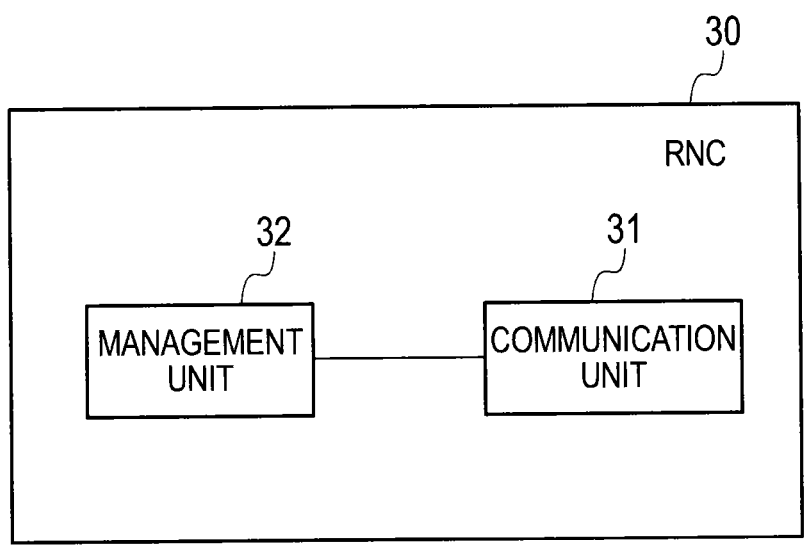
FIG. 2 is a diagram illustrating RNC 30 according to the first embodiment.

Hereinafter, the configuration of the radio control device according to the first embodiment will be described with reference to the accompanying drawings. FIG. 2 is a diagram illustrating the RNC 30 according to the first embodiment. As illustrated in FIG. 2, the RNC 30 includes a communication unit 31 and a management unit 32.

The communication unit 31 communicates with other devices. Specifically, the communication unit 31 communicates with the UE 10, the NBs 20, and the RNCs 30. In addition, the communication unit 31 may also communicate with NB 20 managed by another RNC 30.

Communication between the UE 10 and the RNC 30, for example, is performed according to a RRC (Radio Resource Control) protocol. Communication between the NB 20 and the RNC 30, for example, is performed according to a NBAP (NodeB Application Part) protocol. Communication between the RNCs 30, for example, is performed according to a RNSAP (Radio Network Subsystem Application Part) protocol.

The management unit 32 manages a correspondence relation among the HO source cell, the HO destination cell, the HO source NB, the HO destination NB, the HO source RNC, and the HO destination RNC. The management unit 32 manages a correspondence relation between the real address of the HO source RNC and the real address of the HO destination RNC.

For example, a description will be provided for the case in which the RNC 30C serves as a redundant configuration of the RNC 30B in the mobile communication system 100 illustrated in FIG. 1. That is, a description will be provided for the case in which the RNC 30C takes over the function of the RNC 30B when a failure occurs in the RNC 30B.

In such a case, in Inter-RNC handover between the cell #2A and the cell #1B, the RNC 30C should operate as a substitute of the RNC 30B.

For example, the RNC 30C associates "HO source", "HO destination", and "STATUS" with one another to manage them as illustrated in FIG. 3 and FIG. 4. In addition, FIG. 3 illustrates information managed by the RNC 30C and FIG. 4 illustrates information managed by the RNC 30A.

The "HO source" includes the HO source cell, the HO source NB, the HO source RNC, a real address of the HO source RNC, a virtual address of the HO source RNC, and the like.

The "HO destination" includes the HO destination cell, the HO destination NB, the HO destination RNC, a real address of the HO destination RNC, a virtual address of the HO destination RNC, and the like.

The "STATUS" includes values indicating whether a correspondence relation (a record) is in a valid state. When the correspondence relation (the record) is in the valid state, "ACT (Activated)" is set as the "STATUS". When the correspondence relation (the record) is not in the valid state, "SBY (Standby)" is set as the "STATUS".

Firstly, information managed by the RNC 30C taking over the function of the RNC 30B when a failure occurs in the RNC 30B will be described with reference to FIG. 3.

As illustrated in FIG. 3, when the cell #1B is the HO destination cell as with the record No. 5, the RNC 30C associates and manages the RNC 30C as the HO destination RNC that manages the cell #1B.

Furthermore, the RNC 30C manages a virtual address of the RNC 30C as an address of the HO destination RNC. Furthermore, when a failure occurs in the RNC 30B, "STATUS" of the record No. 5 is changed to "ACT".

Similarly, when the cell #1B is the HO source cell as with the record No. 6, the RNC 30C associates and manages the RNC 30C as the HO source RNC that manages the cell #1B. Furthermore, the RNC 30C manages a virtual address of the RNC 30C as an address of the HO source RNC. Furthermore, when a failure occurs in the RNC 30B, "STATUS" of the record No. 6 is changed to "ACT".

Secondly, information managed by the RNC 30A, in which a correspondence relation between the "HO source" and the "HO destination" needs to be corrected, when a failure occurs in the RNC 30B will be described with reference to FIG. 4.

As illustrated in FIG. 4, when the cell #1B is the HO destination cell as with the record No. 5, the RNC 30A associates and manages the RNC 30C as the HO destination RNC that manages the cell #1B. Furthermore, the RNC 30A manages a virtual address of the RNC 30C as an address of the HO destination RNC. Furthermore, when a failure occurs in the RNC 30B, "STATUS" of the record No. 5 is changed to "ACT".

Similarly, when the cell #1B is the HO source cell as with the record No. 6, the RNC 30A associates and manages the RNC 30C as the HO source RNC that manages the cell #1B. Furthermore, the RNC 30A manages a virtual address of the RNC 30C as an address of the HO source RNC. Furthermore, when a failure occurs in the RNC 30B, "STATUS" of the record No. 6 is changed to "ACT".

Furthermore, it is noted that when a failure occurs in the RNC 30B, the RNC 30A changes "STATUS" of a record, in which the RNC 30B is managed as the HO source RNC or the HO destination RNC, to "SBY" as with the record No. 3 and the record No. 4.

Furthermore, the RNC 30A and the RNC 30B inquire a virtual address of another connectable RNC 30. Furthermore, it is preferable that the inquiry of the virtual address is periodically performed.

It is preferable that the RNC 30B determines whether the RNC 30C serves as the redundant configuration of the RNC 30B, in order to prevent the overlap of virtual addresses. That is, it is preferable that the RNC 30C manages the cell #2B managed by the RNC 30B as the redundant configuration of the RNC 30B upon request of the RNC 30B.

Alternatively, it may be determined in advance that the RNC 30C serves as the redundant configuration of the RNC 30B. That is, the RNC 30C may manage in advance the cell #2B managed by the RNC 30B as the redundant configuration of the RNC 30B without the request of the RNC 30B.

The RNC 30C notifies the RNC 30A to the effect that the RNC 30C operates as the redundant configuration of the RNC 30B. That is, the RNC 30C notifies the RNC 30A of the virtual address of the RNC 30C. In addition, the virtual address may be periodically notified. Alternatively, the virtual address may also be notified upon request (the inquiry of the virtual address) of the RNC 30A.

In the examples illustrated in FIG. 3 and FIG. 4, the RNC 30C operating as the redundant configuration of the RNC 30B is determined by the RNC 30B. The RNC 30C notifies the RNC 30A of the virtual address of the RNC 30C.

(Operation of Mobile Communication System)

Figure 5:
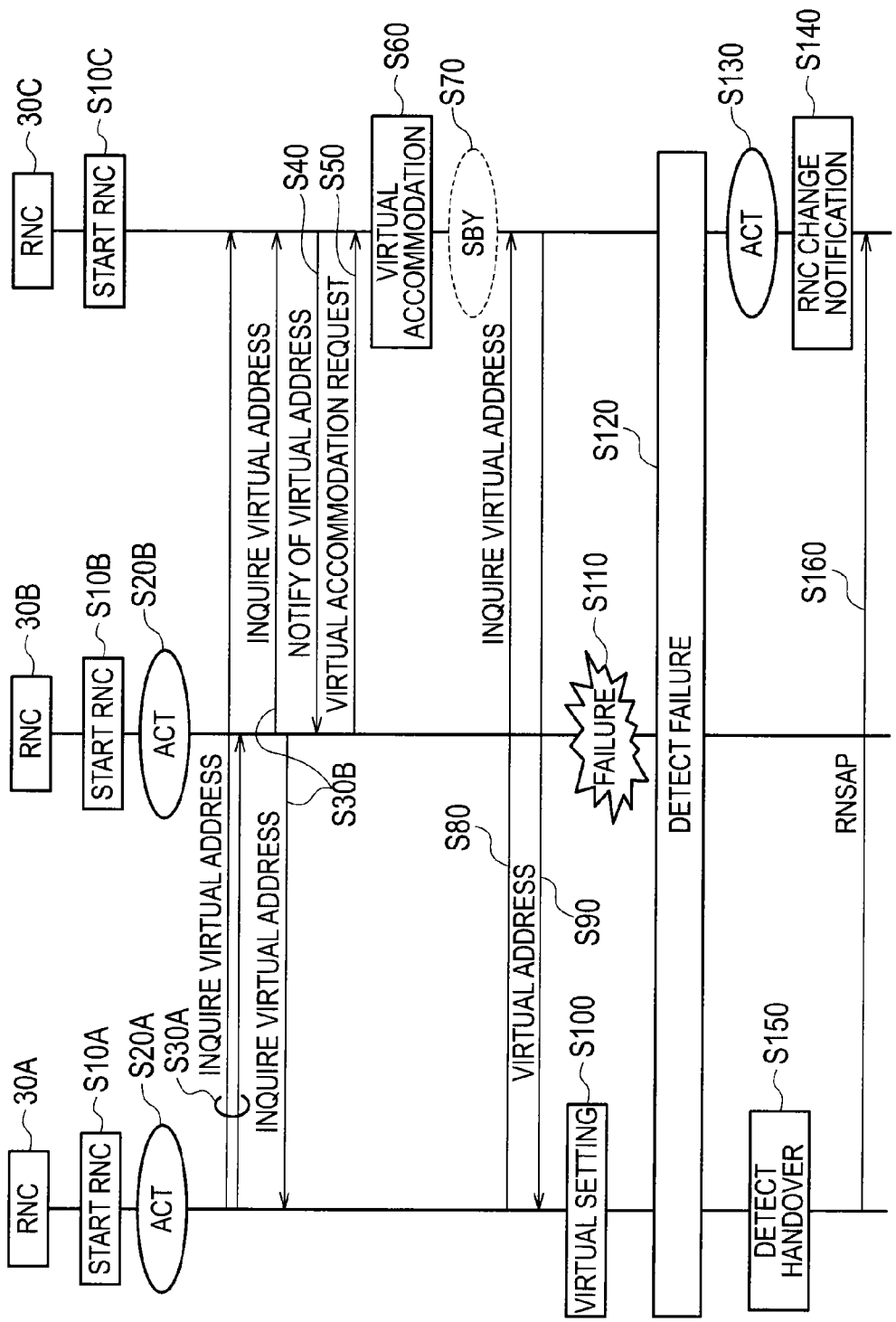
FIG. 5 is a sequence diagram illustrating an operation of the mobile communication system 100 according to the first embodiment.
Figure 6:
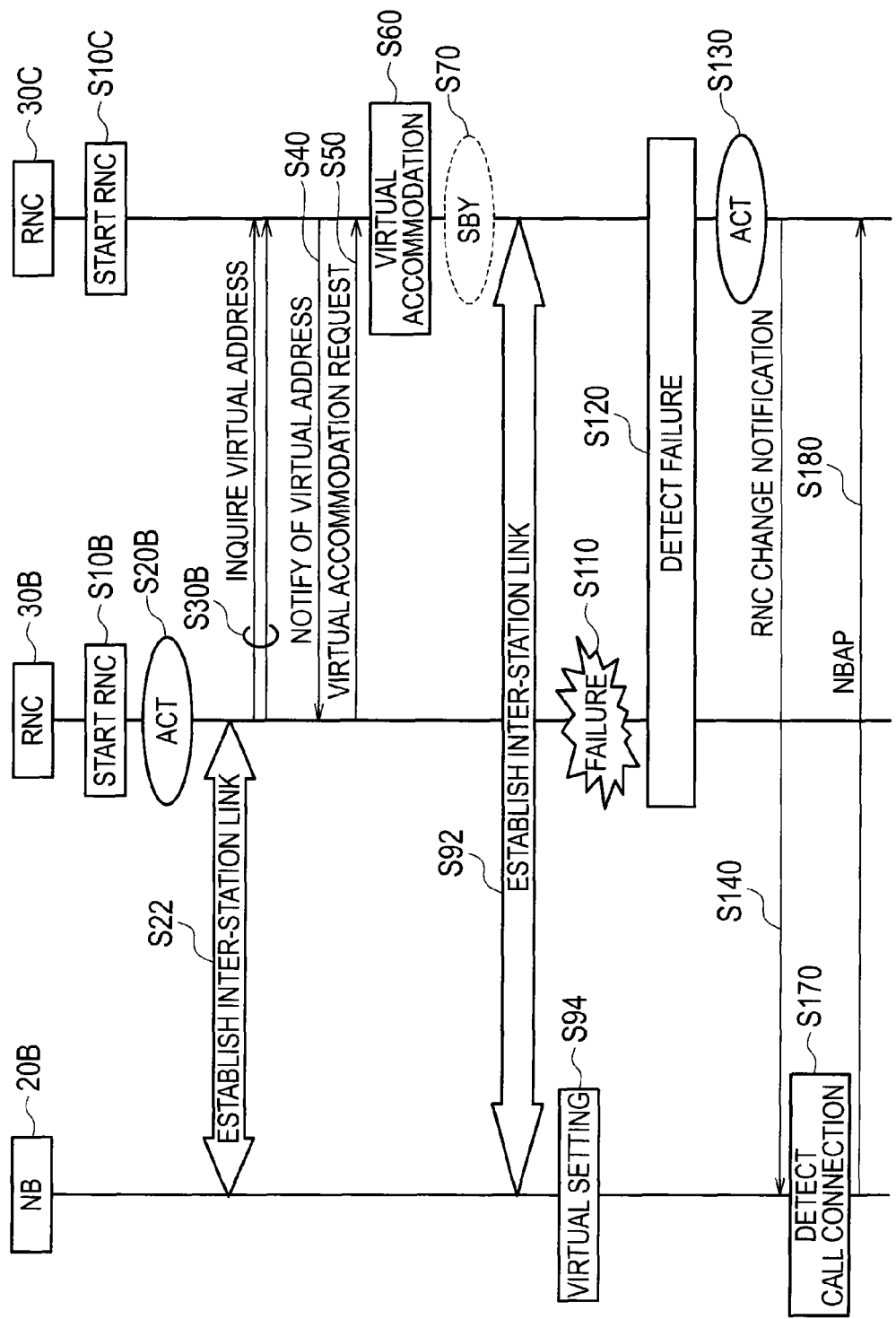
FIG. 6 is a sequence diagram illustrating the operation of the mobile communication system 100 according to the first embodiment.

Hereinafter, an operation of the mobile communication system according to the first embodiment will be described with reference to the accompanying drawings. FIG. 5 and FIG. 6 are sequence diagrams illustrating the operation of the mobile communication system 100 according to the first embodiment. In addition, with reference to FIG. 5 and FIG. 6, a description will be provided for the case in which the RNC 30C operates as the redundant configuration of the RNC 30B when a failure occurs in the RNC 30B. Accordingly, it is noted that an operation not related to such a case will be omitted.

Firstly, the Inter-RNC handover will be described with reference to FIG. 5.

As illustrated in FIG. 5, in step 10A to step 10C, the RNC 30A to the RNC 30C are powered on.

In step 20A, the RNC 30A sets "STATUS" of the correspondence relation (the record), in which the cell #1A and the cell #2A are managed as the HO source cell or the HO destination cell, to "ACT". The RNC 30B sets "STATUS" of the correspondence relation (the record), in which the cell #1B and the cell #2B are managed as the HO source cell or the HO destination cell, to "ACT".

In step 30A, the RNC 30A inquires virtual addresses of the RNCs 30 (here, the RNC 30B and the RNC 30C) to which the RNC 30A is connectable. In step 30B, the RNC 30B inquires virtual addresses of the RNCs 30 (here, the RNC 30A and the RNC 30C) to which the RNC 30B is connectable.

In addition, it is noted that the inquiry of the virtual address is performed in order to find the RNC 30C that operates the function of the RNC 30B as a redundant configuration. It is preferable that the inquiry of the virtual address is periodically performed.

In step 40, the RNC 30C notifies the RNC 30B of the virtual address of the RNC 30C. Specifically, when the cell #1B is the HO source cell or the HO destination cell, the RNC 30C notifies the RNC 30B of the virtual address of the RNC 30C in order to operate as the redundant configuration of the RNC 30B.

In step 50, the RNC 30B determines the RNC 30C as RNC 30 that operates as the redundant configuration of the RNC 30B. Then, the RNC 30B requests the RNC 30C to operate as the redundant configuration of the RNC 30B.

In addition, when the RNC 30C operates as the redundant configuration of the RNC 30B, the RNC 30C virtually accommodates a cell (the cell #1B) managed by the RNC 30B. Accordingly, in the embodiment, a request for the operation as the redundant configuration of the RNC 30B is called a virtual accommodation request.

In step 60, the RNC 30C determines to operate as the redundant configuration of the RNC 30B. In other words, the RNC 30C virtually accommodates the cell (here, the cell #1B) managed by the RNC 30B.

In step 70, the RNC 30C generates a correspondence relation (a record) in which an address of the HO source RNC or the HO destination RNC is the virtual address of the RNC 30C. Furthermore, the RNC 30C sets "STATUS" of a correspondence relation (a record), which relates to the cell #1B virtually accommodated, to "SBY".

In step 80, the RNC 30A inquires the virtual address of the RNC 30 (here, the RNC 30C) to which the RNC 30A is connectable.

In step 90, the RNC 30C notifies the RNC 30A of the virtual address of the RNC 30C. Specifically, when the cell #1B is the HO source cell or the HO destination cell, the RNC 30C notifies the RNC 30A of the virtual address of the RNC 30C in order to operate as the redundant configuration of the RNC 30B.

In step 100, the RNC 30A sets the RNC 30C as the redundant configuration of the RNC 30B. In other words, the RNC 30A virtually sets the virtual address of the RNC 30C as the address of the HO source RNC or the HO destination RNC with respect to the cell (here, the cell #1B) managed by the RNC 30B.

In step 110, a failure occurs in the RNC 30B.

In step 120, the RNC 30A and the RNC 30C detect the failure of the RNC 30B.

In step 130, the RNC 30C sets the "STATUS" of the correspondence relation (the record) in which the address of the HO source RNC or the HO destination RNC is the virtual address of the RNC 30C, to "ACT".

In step 140, the RNC 30C notifies the NB 20B managed by the RNC 30B of the effect that the RNC 30 managing the NB 20B was changed from the RNC 30B to the RNC 30C.

In step 150, the RNC 30A detects handover. Specifically, the RNC 30A detects Inter-RNC handover from the cell #2A to the cell #1B.

In step 160, the RNC 30A transmits information necessary for the Inter-RNC handover to the RNC 30C according to the RNSAP protocol.

Secondly, a call connection will be described with reference to FIG. 6. In addition, in FIG. 6, the same reference numerals are used to designate the same operations as those of FIG. 5. Furthermore, a description for the same operations as those of FIG. 5 will be omitted.

As illustrated in FIG. 6, in step 22, an inter-station link is established between the NB 20B and the RNC 30B. In addition, the process in the step 22 is performed after the RNC 30B starts to operate.

In step 92, an inter-station link is established between the NB 20B and the RNC 30C. In addition, the process in the step 22 is performed after a cell (here, the cell #1B or the cell #2B) managed by the RNC 30B was virtually accommodated in the RNC 30C.

In step 94, the NB 20B sets the RNC 30C as the redundant configuration of the RNC 30B. In other words, the NB 20B virtually sets the virtual address of RNC 30C as an address of the RNC 30C to which the NB 20B is to be connected.

In step 170, the NB 20B receives a call connection request from the UE 10. Specifically, the NB 20B receives the call connection request from the UE 10 camping on the cell #1B or the cell #2B.

In step 180, the NB 20B transmits information necessary for the call connection to the RNC 30C according to the NBAP protocol.

(Operation and Effect)

In the first embodiment, the RNC 30C notifies the RNC 30A of the effect that the RNC 30C manages the cell #1B as the redundant configuration of the RNC 30B. Consequently, in the Inter-RNC handover, even when a failure occurs in the RNC 30 (here, the RNC 30B), it is possible to set a detour path without requiring an enormous work amount.

[Other Embodiments]

The present invention is explained through the above embodiment, but it must not be understood that this invention is limited by the statements and the drawings constituting a part of this disclosure. From this disclosure, various alternative embodiments, examples, and operational technologies will become apparent to those skilled in the art.

In addition, the operation of the above-mentioned RNC 30 may be implemented by hardware, may also be implemented by a software module executed by a processor, or may further be implemented by the combination of the both.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. Such an ASIC may be arranged in the RNC 30. As a discrete component, such a storage medium and processor may be arranged in the RNC 30.

In addition, the entire content of Japanese Patent Application No. 2011-042676 (filed on Feb. 28, 2011) is incorporated in the present specification by reference.

[Industrial Applicability]

According to the present invention, it is possible to provide a mobile communication system capable of setting a detour path without requiring an enormous work amount even when a failure occurs in a radio control device in Inter-RNC handover, and a mobile communication method and a radio control device used in the mobile communication system.

The invention claimed is:

1. A mobile communication system including a first radio control device that manages a first cell, a second radio control device that manages a second cell, and a third radio control device, wherein
the second cell is set as a handover destination cell of the first cell,
the third radio control device manages the second cell as a redundant configuration of the second radio control device,
the third radio control device notifies the first radio control device of the third radio control device managing the second cell as the redundant configuration of the second radio control device, and
the first radio control device sets so that the third radio control device manages the second cell as the redundant configuration of the second radio control device.

2. The mobile communication system according to claim 1, wherein the third radio control device manages the second cell as the redundant configuration of the second radio control device upon request of the second radio control device.

3. The mobile communication system according to claim 1, wherein the third radio control device manages in advance the second cell as the redundant configuration of the second radio control device without a request of the second radio control device.

4. The mobile communication system according to claim 1, wherein the third radio control device notifies the first radio control device of the third radio control device managing the second cell as the redundant configuration of the second radio control device, in response to an inquiry from the first radio control device.

5. The mobile communication system according to claim 1, wherein the first radio control device periodically inquires whether the second cell is managed as the redundant configuration.

6. A mobile communication method, which is used in a mobile communication system including a first radio control device that manages a first cell, a second radio control device that manages a second cell, and a third radio control device, comprising:
the second cell is set as a handover destination cell of the first cell,
a step of managing, by the third radio control device, the second cell as a redundant configuration of the second radio control device;
a step of notifying, by the third radio control device, the first radio control device of the third radio control device managing the second cell as the redundant configuration of the second radio control device; and
a step of setting, by the first radio control device, so that the third radio control device manages the second cell as the redundant configuration of the second radio control device.

7. A radio control device, which is used in a mobile communication system including a first radio control device that manages a first cell and a second radio control device that manages a second cell, comprising:
the second cell is set as a handover destination cell of the first cell,
a management unit that manages the second cell as a redundant configuration of the second radio control device; and
a notification unit that notifies the first radio control device of the management unit managing the second cell as the redundant configuration of the second radio control device.

* * * * *